United States Patent
Boyd

(10) Patent No.: US 10,536,038 B1
(45) Date of Patent: Jan. 14, 2020

(54) SYSTEM FOR HARVESTING ENERGY FOR A VEHICLE

(71) Applicant: Honda Motor Co., Ltd., Tokyo (JP)

(72) Inventor: William Joseph Boyd, Mansfield, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/048,604

(22) Filed: Jul. 30, 2018

(51) Int. Cl.
*H02J 50/20* (2016.01)
*H04B 1/08* (2006.01)
*H04B 1/16* (2006.01)
*H01Q 1/32* (2006.01)
*H01Q 5/30* (2015.01)
*H02J 7/02* (2016.01)
*H01Q 1/24* (2006.01)
*H02J 50/27* (2016.01)
*B60R 16/03* (2006.01)
*H02J 7/34* (2006.01)

(52) U.S. Cl.
CPC ............ *H02J 50/20* (2016.02); *H01Q 1/248* (2013.01); *H01Q 1/3208* (2013.01); *H01Q 5/30* (2015.01); *H02J 7/025* (2013.01); *H04B 1/082* (2013.01); *H04B 1/1607* (2013.01); *B60R 16/03* (2013.01); *H02J 7/345* (2013.01)

(58) Field of Classification Search
CPC .. H02J 50/00; H02J 50/20; H02J 50/23; H02J 50/27
USPC ......................................... 455/271
See application file for complete search history.

(56) References Cited

U.S. PATENT DOCUMENTS

| | | | | |
|---|---|---|---|---|
| 5,828,554 | A | * | 10/1998 | Donegan .................. B60K 6/28 361/707 |
| 8,362,745 | B2 | | 1/2013 | Tinaphong |
| 8,621,245 | B2 | | 12/2013 | Shearer et al. |
| 9,559,605 | B2 | | 1/2017 | Gudan et al. |
| 9,845,050 | B1 | | 12/2017 | Garza et al. |
| 2012/0100876 | A1 | * | 4/2012 | Anderson ........... H04M 1/6091 455/466 |
| 2015/0002262 | A1 | | 1/2015 | Geerlings et al. |
| 2016/0101736 | A1 | | 4/2016 | Geerlings et al. |
| 2017/0353869 | A1 | | 12/2017 | Sen et al. |
| 2017/0372534 | A1 | | 12/2017 | Steketee et al. |

OTHER PUBLICATIONS

Lumpkins, W., Nikola Tesla's Dream Realized: Wireless power energy harvesting. IEEE Consumer Electronics Magazine, 3(1) 2014 pp. 39-42.

* cited by examiner

*Primary Examiner* — Lee Nguyen
(74) *Attorney, Agent, or Firm* — Armstrong Teasdale LLP

(57) ABSTRACT

A system for harvesting energy for a vehicle includes an antenna, a DC bus, a receiver circuit, and an electrical load. The antenna is located on the vehicle and is configured to receive a plurality of signals in at least one of a 2.4 gigahertz band and a 5.9 gigahertz band. The receiver circuit is coupled to the antenna and the DC bus. The receiver circuit is configured to convert the plurality of signals to a DC signal that is transmitted onto the DC bus. The electrical load is coupled to the DC bus and is configured to operate at least when the vehicle is not running using the DC signal supplied by the receiver circuit.

19 Claims, 3 Drawing Sheets

SYSTEM FOR HARVESTING ENERGY FOR A VEHICLE

FIELD

The field of the disclosure relates generally to harvesting energy from wireless broadcasts and, more specifically, to a system for a vehicle to harvest energy from wireless broadcasts in the 2.4 Gigahertz or 5.9 Gigahertz bands.

BACKGROUND

Modern vehicles are becoming increasingly reliant on electrical systems and, consequently, electrical power. Likewise, conventional electrical systems for vehicles have become more sophisticated and, in some cases, are linked together with the numerous other electrical systems by their respective electrical control units, or "ECUs." Such electrical systems range from a conventional AM/FM radio, engine management system, and/or an antilock braking system (ABS), to modern infotainment systems, instrument panels, and security systems. Many of these electrical systems power-down when the vehicle is turned off, and power-up when the vehicle is turned on. At least some of the electrical systems in modern vehicles operate continuously, even when the vehicle is turned off, including, for example, security systems, instrument panels, infotainment systems, and keyless entry, or "fob," systems.

Many vehicles that incorporate electrical systems that are powered continuously utilize the vehicle's onboard electrical power source, e.g., a battery. Such electrical systems generally operate in an "idle" or "sleep" mode that reduces their power demands as compared to when the vehicle is running and drawing power from, for example, an alternator or other electrical power conversion system. Accordingly, the vehicle's "quiescent" electrical load, i.e., the electrical load when the vehicle is turned off, is typically small enough, e.g., 5 milliamps to 200 milliamps, that the vehicle's battery is not so depleted that the vehicle becomes disabled. A need exists, however, to supplement an vehicle's onboard power source to supply electrical power for the vehicle's quiescent electrical load, which has tended to increase over the many years of development in the vehicle industry.

BRIEF DESCRIPTION

One aspect of the present disclosure includes a system for harvesting energy for a vehicle. The system includes an antenna, a DC bus, a receiver circuit, and an electrical load. The antenna is located on the vehicle and is configured to receive a plurality of signals in at least one of a 2.4 gigahertz band and a 5.9 gigahertz band. The receiver circuit is coupled to the antenna and the DC bus. The receiver circuit is configured to convert the plurality of signals to a DC signal that is transmitted onto the DC bus. The electrical load is coupled to the DC bus and is configured to operate at least when the vehicle is not running using the DC signal supplied by the receiver circuit.

Another aspect of the present disclosure includes a method of harvesting energy for a vehicle. The method includes receiving, at an antenna on the vehicle, a plurality of signals in at least one of a 2.4 gigahertz band and a 5.9 gigahertz band. The method includes converting the plurality of signals to a direct current (DC) signal. The method includes transmitting the DC signal onto a DC bus for the vehicle. The method includes supplying the DC signal from the DC bus to an electrical load for the vehicle, the electrical load configured to operate at least when the vehicle is not running.

Yet another aspect of the present disclosure includes a vehicle. The vehicle includes a direct current (DC) bus, a plurality of electrical loads, an antenna, and a receiver circuit. The plurality of electrical loads is coupled to the DC bus and is configured to operate at least when the vehicle is not running. The antenna is configured to receive a plurality of signals in at least one of a 2.4 gigahertz band and a 5.9 gigahertz band. The receiver circuit is coupled to the antenna and the DC bus. The receiver circuit is configured to convert the plurality of signals to a DC signal that is transmitted onto the DC bus to supply the plurality of electrical loads.

The features, functions, and advantages that have been discussed can be achieved independently in various embodiments or may be combined in yet other embodiments further details of which can be seen with reference to the following description and drawings.

DETAILED DESCRIPTION

Embodiments of the systems described herein include a system for harvesting energy for a vehicle from wireless broadcasts. Such systems include an antenna for receiving signals in the 2.4 gigahertz and/or 5.9 gigahertz bands, which are bands allocated for WiFi communication. The 5.9 gigahertz band also includes a 70 megahertz band allocated for vehicular traffic safety-related communication, sometimes referred to as vehicle-to-vehicle communication, or dedicated short-range communications (DSRC). Antennas for the systems and methods described herein may utilize DSRC antennas available on at least some vehicles. Systems described herein include a receiver circuit for receiving signals through the antenna, and converting those signals to direct current (DC) power for operating at least some electrical subsystems of the vehicle or for storing in an energy storage device, such as, for example, a battery. In particular, systems and methods described herein supply DC power harvested from wireless broadcasts via the antenna to electrical subsystems that operate at least when the vehicle is not running, and possibly also operate when the vehicle is running and generating its own power via, for example, an alternator.

Figure 1:
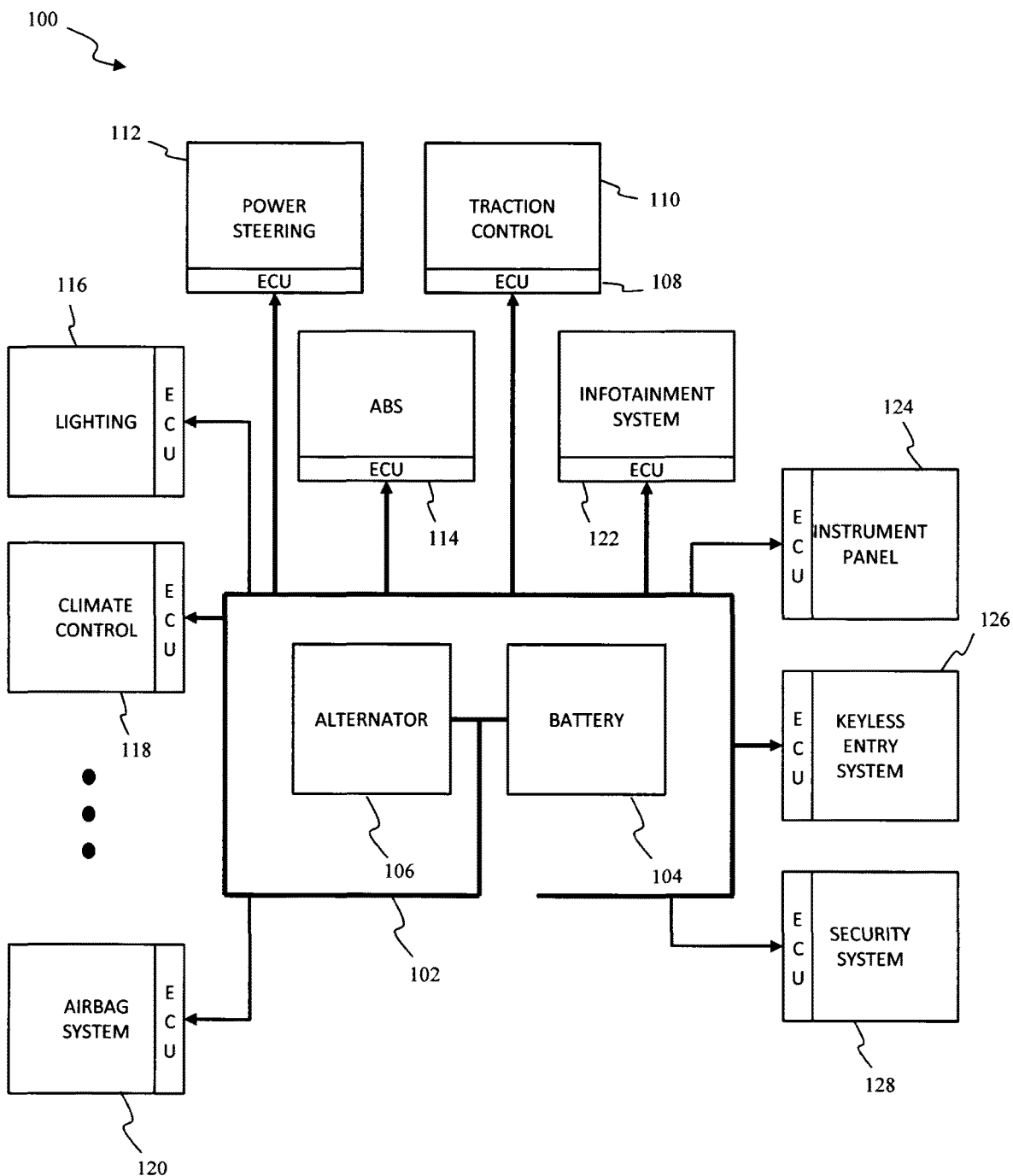
FIG. 1 is a block diagram of an exemplary electrical system for a vehicle.

FIG. 1 is a block diagram of an exemplary electrical system 100 for a vehicle. Electrical system 100 includes a DC bus 102 that is energized by a battery 104, an alternator 106, or both. Generally, DC bus 102 is energized by battery 104 when the vehicle is not running, and is energized by alternator 106 when the vehicle is running. Further, when the vehicle is running, alternator 106 supplies sufficient energy to DC bus 102 to power electrical loads, as well as to charge battery 104. In alternative embodiments, the vehicle may also include a fuel cell for generating electrical power or any other suitable energy storage device. Electrical system 100 includes various electrical loads, each of which includes an electrical control unit (ECU) 108 that manages both electrical power and communications for the respective electrical loads, or electrical subsystems. The various electrical loads include a traction control system 110, a power steering system 112, an antilock braking system (ABS) 114, a lighting system 116, a climate control system 118, and an airbag system 120.

Electrical system 100 also includes certain other electrical subsystems that may operate when the vehicle is not running, such as an infotainment system 122, an instrument panel 124, a keyless entry system 126, and a security system 128. At least some modern infotainment systems 122 utilize computing systems and software that requires some amount of time to boot-up after a period of time of being powered down, such as when the vehicle is not running. Accordingly, some modern infotainment systems 122 continue to operate when the vehicle is not running, to reduce boot-up time when the vehicle is turned on. In certain embodiments, infotainment system 122 may operate in an idle, or sleep, mode that reduces the power consumption of infotainment system 122 as compared to operation while the vehicle is running. Likewise, at least some modern instrument panels 124 also include processors and software that can continue to operate when the vehicle is not running. The primary purpose of keyless entry system 126 is to operate when the vehicle is not running. For example, keyless entry system 126 continuously monitors for signals transmitted by one or more key fobs to initialize some action by the vehicle, such as, for example, unlocking doors, actuating windows, actuating a hatch, emitting a tone, controlling lights, or starting an engine. Likewise, security system 128 includes, for example, acoustic sensors for detecting break-ins and collisions, and other anti-theft systems that primarily operate when the vehicle is not running. Electrical loads such as infotainment system 122, instrument panel 124, keyless entry system 126, and security system 128, among others, represent a quiescent electrical load that is conventionally supplied power from battery 104 when the vehicle is not running.

Vehicles generally include different and more numerous electrical subsystems that are not shown in FIG. 1. The electrical subsystems illustrated in FIG. 1 are for example only. A person having ordinary skill in the field of vehicular electrical systems would understand the variety of electrical subsystems that may be integrated into a vehicle or other vehicle. The term "vehicle" may include, for example, and without limitation: cars, trucks, vans, minivans, SUVs, motorcycles, scooters, boats, personal watercraft, and aircraft.

Figure 2:
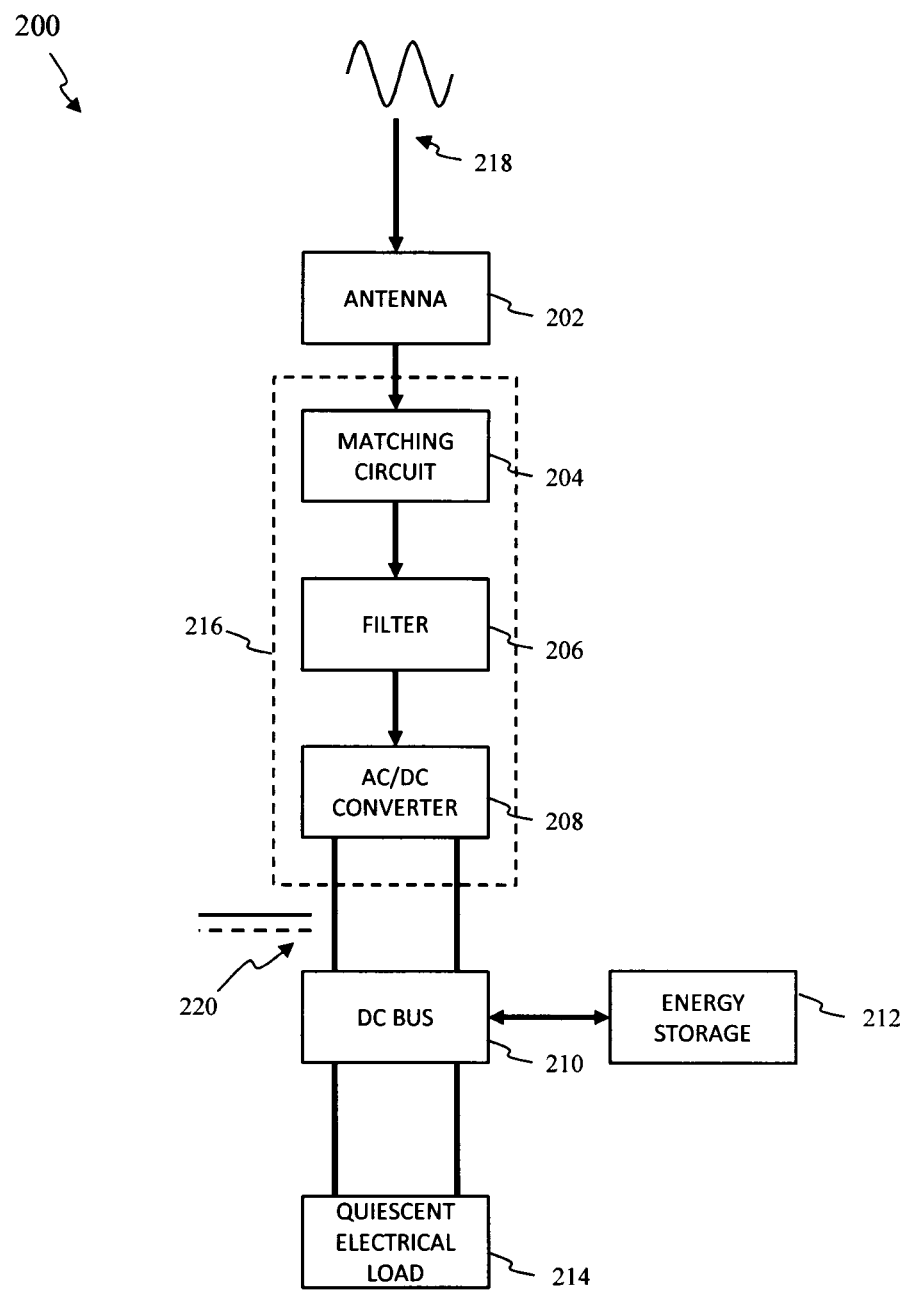
FIG. 2 is a schematic diagram of an exemplary system for harvesting energy for a vehicle.

FIG. 2 is a schematic diagram of an exemplary system 200 for harvesting energy for a vehicle. System 200 includes an antenna 202, a matching circuit 204, a filter 206, an alternating current/direct current (AC/DC) converter 208, a DC bus 210, an energy storage device 212, and a quiescent electrical load 214. Matching circuit 204, filter 206, and AC/DC converter 208 form a receiver circuit 216.

Antenna 202 is located on the vehicle, for example, in a molded antenna component (e.g., a "shark fin") located on the roof or rear hatch, or integrated into a glass or body panel. In alternative embodiments, antenna 202 may be located in any suitable place in the vehicle that enables it to receive wireless broadcast signals. Antenna 202 is configured to receive radio frequency (RF) signals 218 in, for example, the 2.4 gigahertz band, the 5.9 gigahertz band, or both. The 2.4 gigahertz band and 5.9 gigahertz band are both allocated for Wifi communications. The 5.9 gigahertz band also includes a spectrum, e.g., a 70 megahertz spectrum, allocated for vehicular traffic safety-related communication, sometimes referred to as vehicle-to-vehicle communication, or dedicated short-range communications (DSRC). Antenna 202, in certain embodiments, is a DSRC antenna configured to receive RF signals 218 broadcast, for example, by business and residential Wifi nodes, or other vehicles equipped with a DSRC antenna. A 5.9 gigahertz antenna, such as the DSRC antenna, can efficiently receive RF signals 218 in the 5.9 gigahertz band, as well as some signals in the 2.4 gigahertz band.

Receiver circuit 216 is coupled to antenna 202 and DC bus 210. Receiver circuit 216 converts the RF signals received by antenna 202 into a DC signal that is transmitted onto DC bus 210. Receiver circuit 216 includes matching circuit 204. Matching circuit 204 is an impedance matching circuit that enables energy efficient reception of RF signals 218 by antenna 202 and receiver circuit 216. The precise impedance matching circuit 204 provides is calibrated to the design of antenna 202 and the RF channels on which it operates. For example, matching circuit 204 may provide a 50 ohm impedance in certain embodiments. In alternative embodiments, matching circuit 204 may provide a 75 ohm impedance. An improper-impedance termination, or "impedance mismatch," may result in at least some reflection of the RF signals 218 back onto the channel, which results in standing waves and inefficient transfer of power from RF signals 218 to receiver circuit 216.

Receiver circuit 216, in certain embodiments, includes filter 206. Filter 206 may include one or more bandpass, low-pass, or high-pass filters tuned to filter one or more of certain bands of frequencies from RF signals 218 received by antenna 202. For example, filter 206 may be tuned to filter an RF frequency band allocated for a particular communication system on the vehicle, such as AM/FM radio, keyless entry fob, or "BIDIR," receivers, Sirius radio and XM radio (or other satellite radio systems), and global navigation satellite systems (GNSS). Filter 206 reduces power drawn by system 200 from RF channels that are otherwise utilized for other communication systems, particularly those on the vehicle.

Receiver circuit 216 includes AC/DC converter 208 that rectifies RF signals 218 to a DC signal 220. DC signal 220 is then transmitted onto DC bus 210. DC bus 210 is coupled to energy storage device 212 and one or more quiescent electrical loads 214. DC bus 210 supplies DC signal 220 to quiescent electrical loads 214 to operate those electrical subsystems when the vehicle is not running. DC bus 210 supplies DC signal 220 to energy storage device 212 to store the charge generated by DC signal 220. In certain embodiments, energy storage device 212 is a battery, such as battery 104 shown in FIG. 1. In certain embodiments, energy storage device 212 includes one or more capacitors for holding the charge of DC bus 210.

Figure 3:
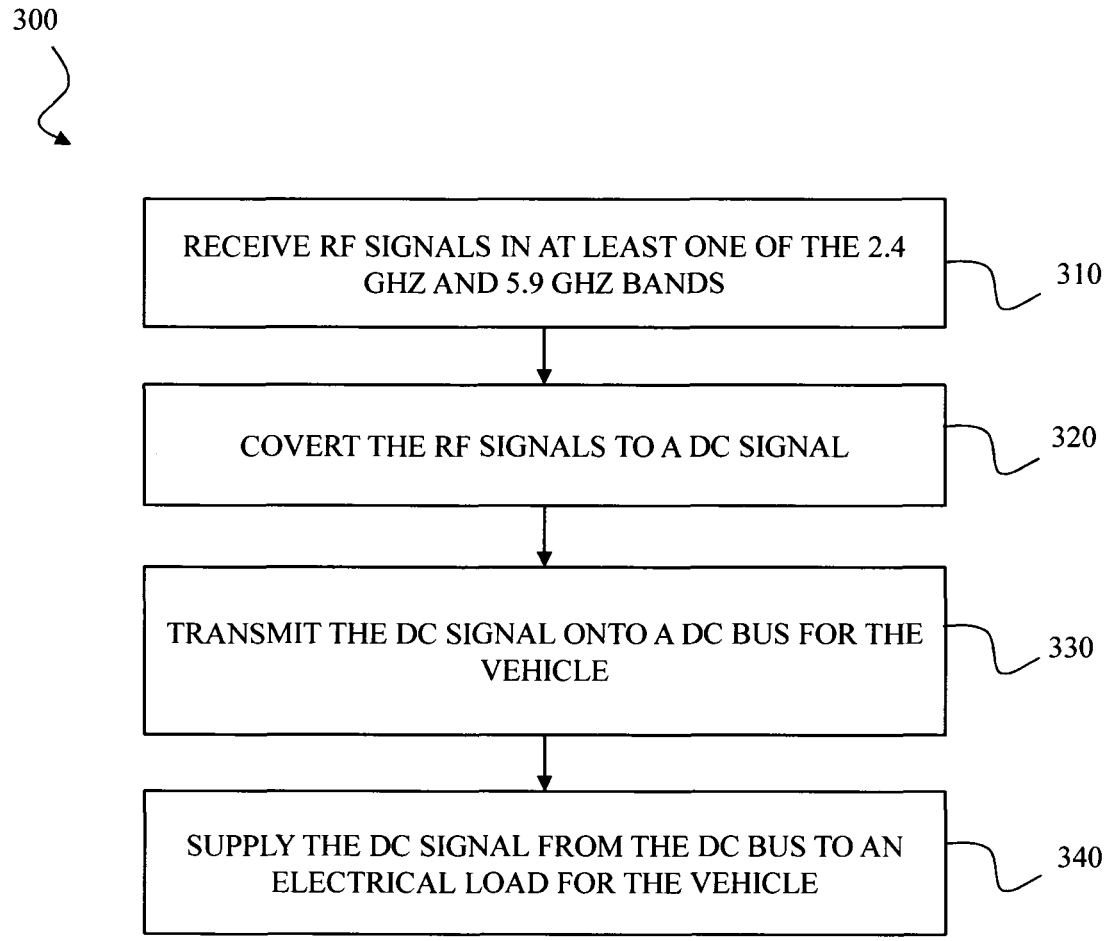
FIG. 3 is a flow diagram of an exemplary method of harvesting energy for a vehicle.

FIG. 3 is a flow diagram of an example method 300 of harvesting energy for a vehicle using, for example, the system 200 shown in FIG. 2. Method 300 is described below with reference to FIGS. 2 and 3.

RF signals 218 are received 310 at antenna 202 on the vehicle. RF signals 218 received 310 at antenna 202 may include a plurality of signals in the 2.4 gigahertz band, a plurality of signals in the 5.9 gigahertz band, or both. Receiving 310 RF signals 218 may, in certain embodiments, include receiving 310 using a DSRC antenna integrated into the vehicle.

RF signals 218 are converted 320 to DC signals 220 by, for example, receiver circuit 216, which may include, in certain embodiments, matching circuit 204, filter 206, and AC/DC converter 208. DC signals 220 are then transmitted 330 onto DC bus 210 for the vehicle. DC bus 210 distributes DC power throughout the vehicle, supplying 340 the DC signal to one or more electrical loads for the vehicle, particularly quiescent electrical load 214. Quiescent electrical load 214 may include, for example, a security system, a keyless entry system, an instrument panel, or an infotainment system, such as security system 128, keyless entry system 126, instrument panel 124, and infotainment system 122 shown in FIG. 1. In alternative embodiments, quiescent electrical load 214 may include any other electrical subsystem that may operate when the vehicle is not running.

In certain embodiments, method 300 includes filtering at least one RF band from RF signals 218. For example, filter 206 may filter an RF band corresponding to one or more communication system for the vehicle.

In certain embodiments, method 300 includes supplying the DC signal to energy storage device 212, which may include, for example, a battery or one or more capacitors.

Example technical effects of the methods, systems, and apparatus described herein include at least one of: (a) utilizing a 2.4 gigahertz or 5.9 gigahertz antenna for harvesting energy from wireless broadcasts; (b) supplying DC power to electrical systems and energy storage devices of a vehicle, particularly electrical systems that operate at least when the vehicle is not running; (c) utilizing existing DSRC antennas for harvesting energy from wireless broadcasts in the 2.4 gigahertz and 5.9 gigahertz bands; and (d) filtering other RF bands dedicated for other communication systems of the vehicle from the wireless broadcast signals to be converted to DC power.

Some embodiments involve the use of one or more electronic processing or computing devices. As used herein, the terms "processor" and "computer" and related terms, e.g., "processing device," "computing device," and "controller" are not limited to just those integrated circuits referred to in the art as a computer, but broadly refers to a processor, a processing device, a controller, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processing (DSP) device, an application specific integrated circuit (ASIC), and other programmable circuits or processing devices capable of executing the functions described herein, and these terms are used interchangeably herein. The above are examples only, and thus are not intended to limit in any way the definition or meaning of the terms processor, processing device, and related terms.

In the embodiments described herein, memory may include, but is not limited to, a non-transitory computer-readable medium, such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROMs, DVDs, and any other digital source such as a network or the Internet, as well as yet to be developed digital means, with the sole exception being a transitory, propagating signal. Alternatively, a floppy disk, a compact disc-read only memory (CD-ROM), a magneto-optical disk (MOD), a digital versatile disc (DVD), or any other computer-based device implemented in any method or technology for short-term and long-term storage of information, such as, computer-readable instructions, data structures, program modules and sub-modules, or other data may also be used. Therefore, the methods described herein may be encoded as executable instructions, e.g., "software" and "firmware," embodied in a non-transitory computer-readable medium. Further, as used herein, the terms "software" and "firmware" are interchangeable, and include any computer program stored in memory for execution by personal computers, workstations, clients and servers. Such instructions, when executed by a processor, cause the processor to perform at least a portion of the methods described herein.

Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the embodiments described herein, additional output channels may include, but not be limited to, an operator interface monitor.

The systems and methods described herein are not limited to the specific embodiments described herein, but rather, components of the systems and/or steps of the methods may be utilized independently and separately from other components and/or steps described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

As used herein, an element or step recited in the singular and proceeded with the word "a" or "an" should be understood as not excluding plural elements or steps unless such exclusion is explicitly recited. Furthermore, references to "one embodiment" of the present disclosure or "an example embodiment" are not intended to be interpreted as excluding the existence of additional embodiments that also incorporate the recited features.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for harvesting energy for a vehicle, the system comprising:
   an antenna located on the vehicle and configured to receive a plurality of signals in a 2.4 gigahertz band and a 5.9 gigahertz band;
   a direct current (DC) bus;
   a receiver circuit coupled to the antenna and the DC bus, the receiver circuit configured to convert the plurality of signals to a DC signal that is transmitted onto the DC bus, the receiver circuit comprising:
      a matching circuit having a receiver impedance matching a channel impedance for the 2.4 gigahertz band and for the 5.9 gigahertz band; and a filter configured to filter-out, from the plurality of signals, one or more frequency bands allocated for a keyless entry system for the vehicle, a satellite radio, or a navigation system for the vehicle; and a quiescent electrical load coupled to the DC bus and configured to operate at least when the vehicle is not running using the DC signal supplied by the receiver circuit.

2. The system of claim 1 further comprising an energy storage device coupled to the DC bus and configured to receive the DC signal and store a charge resulting therefrom.

3. The system of claim 2, wherein the energy storage device is a battery.

4. The system of claim 2, wherein the energy storage device is at least one capacitor.

5. The system of claim 1, wherein the antenna comprises a dedicated short-range communication (DSRC) antenna.

6. The system of claim 1, wherein the quiescent electrical load comprises a security system.

7. A method of harvesting energy for a vehicle, the method comprising:

receiving, at an antenna on the vehicle, a plurality of signals in a 2.4 gigahertz band and a 5.9 gigahertz band;

matching, by a matching circuit, a channel impedance for the 2.4 gigahertz band and for the 5.9 gigahertz band;

filtering, from the plurality of signals, one or more frequency bands allocated for a keyless entry system for the vehicle, a satellite radio, or a navigation system for the vehicle;

converting the plurality of signals to a direct current (DC) signal;

transmitting the DC signal onto a DC bus for the vehicle; and supplying the DC signal from the DC bus to a quiescent electrical load for the vehicle, the quiescent electrical load configured to operate at least when the vehicle is not running.

8. The method of claim 7 further comprising filtering at least one radio frequency (RF) band from the plurality of signals, the at least one RF band corresponding to at least one communication system for the vehicle.

9. The method of claim 7, wherein supplying the DC signal to the quiescent electrical load comprises supplying the DC signal to a security system.

10. The method of claim 7, wherein receiving the plurality of signals comprises receiving the plurality of signals using a dedicated short-range communication (DSRC) antenna.

11. The method of claim 7 further comprising supplying the DC signal from the DC bus to an energy storage device.

12. The method of claim 11, wherein supplying the DC signal to the energy storage device comprises supplying the DC signal to a battery.

13. The method of claim 11, wherein supplying the DC signal to the energy storage device comprises supplying the DC signal to a capacitor.

14. A vehicle, comprising:
a direct current (DC) bus;
a plurality of quiescent electrical loads coupled to the DC bus and configured to operate at least when the vehicle is not running;
an antenna configured to receive a plurality of signals in a 2.4 gigahertz band and a 5.9 gigahertz band; and
a receiver circuit coupled to the antenna and the DC bus, the receiver circuit configured to convert the plurality of signals to a DC signal that is transmitted onto the DC bus to supply the plurality of quiescent electrical loads, the receiver circuit comprising:
a matching circuit having a receiver impedance matching a channel impedance for the 2.4 gigahertz band and for the 5.9 gigahertz band; and
a filter configured to filter-out, from the plurality of signals, one or more frequency bands allocated for a keyless entry system for the vehicle, a satellite radio, or a navigation system for the vehicle.

15. The vehicle of claim 14 further comprising a battery coupled to the DC bus.

16. The vehicle of claim 14 further comprising a second plurality of electrical loads coupled to the DC bus and configured to operate only when the vehicle is running.

17. The vehicle of claim 16, wherein the second plurality of electrical loads comprises an engine management system.

18. The vehicle of claim 14, wherein the antenna comprises a dedicated short-range communication (DSRC) antenna.

19. The vehicle of claim 14 further comprising a satellite radio system, wherein the receiver circuit comprises a filter configured to filter out a radio frequency (RF) band corresponding to the satellite radio system from the plurality of signals.

* * * * *